United States Patent [19]

Kajiura et al.

[11] 4,016,112

[45] Apr. 5, 1977

[54] PROCESS FOR PRODUCTION OF FOAMED RESIN STRUCTURE

[75] Inventors: Atsusuke Kajiura; Yuzo Aito, both of Hino; Atsushi Sugiyama; Hiroki Tamura, both of Hachioji; Kazuma Aihara, Hino, all of Japan

[73] Assignee: Teijin Limited, Osaka, Japan

[22] Filed: Feb. 14, 1975

[21] Appl. No.: 549,975

Related U.S. Application Data

[63] Continuation of Ser. No. 326,064, Jan. 23, 1973, abandoned.

[52] U.S. Cl. .................... 260/2.5 N; 260/2.5 HA; 260/40 R; 260/42.18; 260/42.47; 260/45.75 R; 260/DIG. 24; 264/DIG. 5
[51] Int. Cl.$^2$ .......................................... C08J 9/08
[58] Field of Search ....... 260/2.5 N, 2.5 HA, 2.5 B; 264/DIG. 5

[56] References Cited

UNITED STATES PATENTS 3,069,367  12/1962  Beaulieu et al. .............. 260/2.5 B

*Primary Examiner*—Morton Foelak
*Attorney, Agent, or Firm*—Sherman & Shalloway

[57] ABSTRACT

In manufacturing a foamed structure from an unsaturated polyester resin, a diallyl phthalate resin and a curable 1,2-polybutadiene resin, foaming of the resin is carried out with the reaction of acid esters of phosphoric acid and/or acid esters of phosphorous acid with metal carbonates and/or metal bicarbonates.

23 Claims, No Drawings

PROCESS FOR PRODUCTION OF FOAMED RESIN STRUCTURE

This is a continuation, of application Ser. No. 326,064, filed Jan. 23, 1973, now abandoned.

The present invention relates to a process for the production of a cured foamed stucture from a curable resin composition capable of being cured three dimensionally by a double bond. More particularly it relates to a process for the production of a cured foamed stucture from a curable resin composition capable of being structured three dimensionally by double bonds and cured with the use of metal carbonates and/or metal bicarbonates and a specified acid substance as a foaming agent.

A curable resin composition capable of being cured three dimensionally by double bonds and cured in the present invention is an organic polymer or a composition containing a mixture comprising a monomer copolymerizable with the organic polymer and the organic polymer, the organic polymer having double bonds in a molecule and thereby polymerizable into a polymer cured three dimensionally by the double bonds, and being in a liquid state at or below temperatures at which a foaming agent foams. For simplicity, the term "a curable resin composition" is used in some cases in place of the curable resin composition capable of being cured three dimensionally.

A resin composition capable of being cured three dimensionally by double bonds is well known in the art, and an unsaturated polyester resin, a diallyl phthalate resin and a 1,2-polybutadiene resin can be listed.

The curable resin composition listed above have so far been used by molding them into furniture, walls or floors of buildings, boats or other articles after they have been reinforced with fiber glass in some cases.

Attempts have recently been made to produce a foamed light weight structure, having desirable adiabatic and high mechanical properties by producing numerous fine voids in the cured material, while the curable resin composition is being cured and molded.

Though a reaction in which metal carbonates or metal bicarbonates react with acid substances to generate carbonic acid gas has been used in producing a foamed structure from natural or synthetic rubber or plastics, the application of the carbonic acid gas-generating reaction of metal carbonates or metal bicarbonates with acid substances has been considered difficult in producing a foamed structure from a curable resin composition. This is because the carbonic acid gas-generating reaction generally proceeds rapidly to a complete generation of carbonic acid gas and eliminates foams before the curable resin composition has sufficiently been cured. The utilization of carbonic acid gas occurring at a time when carbonic acid ester anhydride is decomposed has also been proposed (Japanese patent publication No. 35992/71, Japanese patent publication No. 38357/71 and British Pat. No. 1,214,427). However, these proposals are not suited for commercial production because of the use of a specified foaming agent and the extended time of molding.

Accordingly, it is the object of the present invention to provide an easily practicable process for producing a cured, foamed resin structure from a curable resin composition with the use of a carbonic acid gas-generating reaction of metal carbonates or bicarbonates and a specified acid substance.

It is another object of the present invention to provide a process for producing easily and inexpensively a lightweight foamed resin structure having excellent properties such as heat insulating and sound-arresting properties by retaining in the period of cure the foams generated when metal carbonates or metal bicarbonates, frequently used as fillers for shaped articles, react with acid substances to generate carbonic acid gas.

The above-described objects of the present invention can be attained by generating foams with the reaction in a curable resin composition capable of being cured three dimensionally by double bonds, of metal carbonates and/or metal bicarbonates with acid esters of phosphoric acid and/or acid esters of phosphorus acid in the uniformly dispersed state and curing the resin composition.

The process of the present invention is based on the discovery that if acid esters of phosphoric acid and/or acid esters of phosphorus acid is used as an acid substance to generate carbonic acid gas in a reaction with metal carbonates or metal bicarbonates, the generation of foams due to the generation of carbonic acid gas can be synchronized with the progress of the curing reaction of a curable resin composition over previously known metal carbonate or metal bicarbonate foaming agents.

The acid esters of phosphoric acid to be used in the present invention are compounds shown in the formula

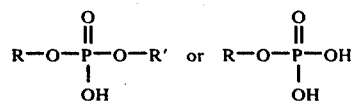

wherein R and R' denote $C_nH_{2n+1}-$ ($n$ is 2 to 20) or $C_mH_{2m+1}(OCH_2CH_2)_l$ ($m$ is 2 to 20 and $l$ is 2 to 10.) or $C_6H_5-$, and the acid esters of phosphorous acid are compounds shown in the formula

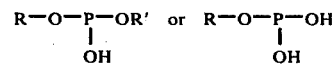

wherein R and R' have the same meaning as above. They may be monoesters, diesters or a mixture thereof. In the case of diesters, R and R' may be the same or different, and further more than 2 compounds optionally selected from them can be mixed and used.

The rate of foaming reaction of the present invention depends on the chain length (R, R') of the alcohol in the components of the acid esters of phosphoric acid and/or the acid esters of phosphorous acid. In the case of acid esters of phosphoric acid having an alkyl group with a comparatively short carbon chain, such as dibutyl acid phosphate or acid esters of phosphorous acid such as dibutyl phosphite, they react with metal carbonates or metal bicarbonates at normal temperature (20° C) or a comparatively low temperature of about 50° C. or below to generate carbonic acid gas. Acid esters of phosphoric acid having a long-chain alkyl group such as dioctyl phosphate and diisodecyl phosphate or acid esters of phosphorous acid scarcely react with metal carbonates or metal bicarbonates at normal temperature, or at a low reaction rate. However, when they are heated to about 50° C. or above, appropriate occurrence of carbonic acid gas can be expected.

The curable resin composition to be used in the present invention can be cured at normal temperatures by the help of an accelerator such as methyl ethyl ketone peroxide and cobalt naphthenate, and when benzoyl peroxide is used, curing and molding at as high a temperature as 80° to 150° C. are practicable. Hence, in molding, an appropriate acid phosphoric (phosphorous) ester can be chosen in accordance with a molding step to be used, molding temperature or the specific gravity required for an end cured structure. That is, in molding at normal temperatures, esters having a short carbon chain such as di-n-butyl phosphate is used and in high-temperature curing, acid phosphoric esters having a long carbon chain such as diisodecyl acid phosphate and/or acid esters of phosphorous acid are preferably used. In this way, proper timing is given to foaming and curing to obtain a desirable foamed structure.

Since the foaming phenomenon also depends on the resin composition, etc., it is ideal to give proper timing to the progress of a curing reaction and that of foaming.

In the present invention, a desirable foamed structure is obtainable for a wide range of molding steps and conditions with the proper selection of the acid phosphoric or phosphorous esters.

Among such desirable acid phosphoric or phosphorous esters are dimethyl phosphate, dibutyl phosphate, dioctyl phosphate, diisodecyl phosphate, diphenyl phosphate and monobutyl phosphate, or dimethyl phosphite, diethyl phosphite, dibutyl phosphite, diphenyl phosphite, and diiospropyl phosphite.

The amount of acid phosphoric or phosphorous esters to be used in the present invention is 0.5 to 20 parts by weight, preferably 1 to 10 parts by weight based on 100 parts by weight of an organic polymer or a composition containing a mixture comprising a monomer copolymerizable with the organic polymer and the organic polymer. It is undesirable to depart from the above limitations because when the added amount is less than 0.5 part by weight, a foaming phenomenon is recognized, but the features of a foamed structure to be obtained by the present invention, which is light in weight and has adiabatic and sound-proof properties cannot be completely attained; and when it exceeds 20 parts by weight, greater amounts of foams are generally formed at a time as compared with the curing velocity of a curable resin composition.

The metal carbonates to be used in the present invention are expressed in the formula $M_m(CO_3)_n$. For metal M are listed metals of group 1 of the periodic table such as Na and K, metals of group 2 such as Mg, Ca Zn and Ba and metals of group 8 such as Fe, Ni and Co.

In the formula, $m$ and $n$ are determined by the valency of the metal M. For instance, in the case of a monovalent metal, $m=2$ and $n=1$ and in the case of a bivalent metal, $m=1$ and $n=1$. Typical metal carbonates are: sodium carbonate, potassium carbonate, calcium carbonate, barium carbonate and magnesium carbonate. A carbonate of two types of metals such as $KNaCO_3$ may be included.

The metal bicarbonates are expressed in the formula $MH(CO_3)_n$ where M stands for metals such as Na and K. In the formula, n depends on the valency of the metal M. For instance, in the case of a monovalent metal, $n=1$. Typical metal bicarbonates are sodium bicarbonate and potassium bicarbonate. A bicarbonate of two types of metals such as $KMgH(CO_3)_2$ may be included.

Two or more types of compounds selected optionally from such metal carbonates and metal bicarbonates may be used at a time. It is desirable to use 1 to 250 parts by weight, preferably 3 to 200 parts by weight based on 100 parts by weight an organic polymer or a composition containing a mixture comprising a monomer copolymerizable with the organic polymer and the organic polymer. If the amount is less than one part by weight, a shaped article having the features of the present invention is unobtainable. If it exceeds 250 parts by weight, it does not leave sufficient strength for use as a structural material.

In order that a foamed resin structure may be produced by the process of the present invention, a curable resin composition in the liquid state at a foaming temperature, which is an organic polymer or a composition containing the organic polymer, polymerizable by double bonds present in molecules into a cured three-dimensionally-cured polymer, is used.

Typical curable resin compositions to be used in the present invention are an unsaturated polyester resin, a diallyl phthalate resin and a 1,2-polybutadiene resin, but they are not limitative.

The unsaturated polyester resin to be used in the present invention is of any well-known combination of an unsaturated acid component, a saturated acid component, a polyhydric alcohol component and a vinyl monomer component.

To explain further, the unsaturated polyester resin is a mixture of (i) an unsaturated polymer prepared by condensing an unsaturated acid component, a polyhydric alcohol, and optionally a saturated acid component, and (ii) a vinyl monomer that is copolymerizable with said unsaturated polyester. Unsaturated dicarboxylic acids to be essentially used in polymerizing such as unsaturated polyester resin include maleic acid, fumaric acid, itaconic acid, citraconic acid and anhydrides thereof, such as maleic anhydride and itaconic anhydride. Saturated dicarboxylic acids include aliphatic dicarboxylic acids such as adipic acid, sebacic acid and succinic acids, aromatic dicarboxylic acids such as phthalic acid, isophthalic acid and terephthalic acid, anhydrides thereof such as succinic anhydride, and phthalic anhydride and halogenated derivatives of carboxylic acids or their anhydrides such as tetrachlorophthalic anhydride, tetrabromophthalic anhydride, HET acid and an adduct of the Diels-Alder reaction of hexachlorocyclopentadiene with tetrahydrophthalic anhydride.

Polylydric alcohols include alcohol are listed ethylene glycol, propylene glycol, diethylene glycol, dipropylene glycol, trimethylene glycol, butanediol-1,3-butanediol-1,4, hexanediol1,6, neopentyl glycol, hydrogenated bisphenol A, a propylene oxide adduct of bisphenol A, an ethylene oxide adduct of bisphenol A, glycerin and pentaerythritol. Further, a condensation product of decachlorobiphenyl and monoethanol amine can also be used as a halogen-containing polyhydric alcohol.

Copolymerizable vinyl monomers include styrene, vinyl toluene, α-methyl styrene, chlorostyrene, t-butyl stryene, methyl methacrylate, ethyl methacrylate, vinyl acetate, diallyl phthalate and triallyl cyanurate.

The diallyl phthalate resin to be used in the process of the present invention is a mixture containing a diallyl phthalate monomer and the linear polymer (prepolymer) obtained by polymerizing the monomer or the prepolymer alone, but the mixture is more common. In other words, the diallyl phthalate resin of this invention is a mixture of a diallyl phthalate monomer and a linear polymer (prepolymer) obtained by the polymerization of the monomer. Alternatively, the prepolymer may be used alone without being admixed with the monomer. Diallyl phthalate monomers include diallyl orthophthalate, diallyl isophthalate, diallyl terephthalate, diallyl (methylisophthalate), diallyl (methylterephthalate) and diallyl naphthalate. A mixture of these monomers also can be used.

The prepolymer of the diallyl phthalate monomer is obtained by polymerizing the diallyl phthalate monomer with a polymerization initiator such as benzoyl peroxide and can form a uniform mixed solution, mixing with the diallyl phthalate monomer. The prepolymer having a molecular weight of 1,000 to 3,000, preferably 3,000 to 20,000 is used.

The percentage mixing of diallyl phthalate monomer and its prepolymer can be optionally selected within a range where the mixture retains a liquid form at foaming temperature. In general, the ratio by weight of the diallyl phthalate monomer to the prepolymer is preferably 95:5 to 20:80, and more preferably 80:20 to 40:60.

In the mixture, unsaturated compounds copolymerizable with the diallyl phthalate monomer component and/or the prepolymer component can be jointly used as the occasion demands.

Such unsaturated compounds include allyl compounds such as diallyl maleate, triallyl cyanurate, triallyl isocyanurate, and triallyl phosphate, vinyl compounds such as styrene, vinyl toluene, methyl methacrylate, ethyl methacrylate and diethyl fumarate and polybutadiene.

The 1,2-polybutadiene polymer to be used in the present invention is a butadiene polymer with more than 30 mole percent, preferably more than 50 mole % and more preferably more than 80 mole % of a 1,2-polymerizing structure in the total recurring units and a number average molecular weight of preferably more than 500 and more preferably 1,000 to 10,000. Such polybutadiene is prepared by optional methods of polymerization such as anionic polymerization through a sodium dispersed body of butadiene, living polymerization, or coordination polymerization. The one obtained under ordinary conditions has hydrogen or an inert organic group attached to both terminals of a polybutadiene chain. If carbonic acid gas is used as a terminator, the one with carboxyl end groups is obtained and if ethylene oxide is used, the one with hydroxyl end groups is obtained. Further, these polybutadienes and polybutadienes with modified end groups can be altered to various types with the use of part of double bonds, carboxyl or hydroxyl groups. For instance, epoxide-modified materials, maleic acid-modified materials or urethane-modified materials also can be used in the present invention.

Further, in the present invention a butadiene copolymer can also be used, in which vinyl compounds such as styrene, α-methyl styrene, vinyl toluene, and acrylonitrile, diene compounds such as isoprene or unsaturated esters such as methyl methacrylate, diethyl maleate, diallyl phthalate and diallyl maleate are copolymerized with butadiene in small amounts and such copolymerization components are usually used below 50 mole percent and preferably below 30 mole percent of the structural units of the butadiene copolymer.

In a curing reaction, conventional curing methods and agents can be used in curing a curable resin capable of being cured three-dimensionally by double bonds, such as an unsaturated polyester resin, a diallyl phthalate resin and 1,2-polybutadiene. For instance, polymerization initiators such as organic peroxides such as benzoyl peroxide and methyl ethyl ketone peroxide, azo compounds such as azobisisobutylonitrile and persulfates can be used and a curing reaction with light or radiation of an electron beam or a gamma ray is practicable.

Polymerization initiators include benzoyl peroxide, di-tertiary-butyl peroxide, cyclohexanone peroxide, cumene hydroperoxide, methyl ethyl ketone peroxide, tertiary butyl perbenzoate, tertiary butyl hydroperoxide, dicumyl peroxide, di-tertiary-amyl peroxide, azobisisobutylonitrile and potassium persulfate.

As the occasion demands, a polymerization accelerator can jointly be used together with the above-described organic peroxides. Cobalt naphthenate, cobalt octenate, copper naphthenate and organic compounds of heavy metals such as iron and vanadium are listed among the accelerators.

The present invention is characterized by synchronizing the occurrence of carbonic acid gas due to a reaction of acid esters of phosphoric acid and/or acid esters of phosphorous acid with metal carbonates and/or metal bicarbonates with respect to the polymerization with curing of a curable resin composition. For this purpose, it is essential to select optionally the types and amounts of polymerization initiators and those of acid esters of phosphoric acid and/or acid esters of phosphorous acid in accordance with the molding temperature to be used.

In order that a foamed structure suitable for the use of a product may be obtained, the types and amounts of acid esters of phosphoric acid and/or acid esters of phosphorous acid are determined such that foaming is completed within a specified period, and then the types and amounts of polymerization initiators and accelerators are determined such that the polymerization and curing of a curable resin composition will be completed within the same time as the foaming due to occurrence of carbonic acid gas is concluded.

When the acid esters of phosphoric acid and/or acid esters of phosphorous acid and the polymerization initiator thus prepared by the two simple preliminary experiments are added to a curable resin composition and thoroughly mixed and agitated, it is possible to complete foaming and curing after a specified period of time. When the generated foams are not completely stably held till the curing resin composition polymerizes and cures, the stability of the foams can be increased with the addition of a foam-stabilizer agent such as a styrene-maleic acid copolymer and/or a silicon-type foam regulator and/or a wetting agent such as a sulfonated castor oil. In the present invention, part of hightemperature decomposing foaming agents such as azo compounds, hydrazide compounds and azide compounds, of well-known types can be jointly used when heating for curing is conducted.

In the present invention, various types of a filler, reinforcing materials, pigments, etc. can jointly be used. Fillers include asbestos, glass powder, silica, clay, mica, SHIRASU white volcanic ashes in Japan, titanium oxide, magnesium oxide, calcium phosphate, gypsum, alumina, foamed clay, foamed glass hollow SHIRASU, white volcanic ashes accumulated in Kagoshima Prefecture, Japan, and other lightweight aggregates. Reinforcing materials include asbestos fibers, fiber glass, carbon fibers, steel filaments and organic fibers such as polyester fibers.

Building materials to be used as an interior or structural material have recently been required to be nonflammable, and if such an inhibitor of combustion as antimony oxide and a filler for preventing combustion such as halogenated paraffin and aluminum hydroxide are used singly or in combustion in the formulation of the curable resin composition to be used in the present invention, a foamed shaped nonflammable article is obtainable. When an unsaturated polyester is used as a curable resin composition, it is desirable to make the composition nonflammable by using the unsaturated resin composition of halogen-containing compounds such as the above-described tetrachlorophthalic anhydride, tetrabromophthalic anhydride, HET acid and an adduct of hexachloropentadiene-tetrahydrophthalic anhydride as a component. Further, with the joint use of the lightweight aggregate and fibrous reinforcing agent described above, the composition can be made into a structural material characterized by nonflammable properties, light weight, thermal insulating property and strength.

According to the present invention, a carbonic acid gas foaming reaction of metal carbonates or metal bicarbonates with acid substances, which have hitherto been applicable to a foaming reaction of a resin, is now available. Carbonic acid gas generated by mixing in a specified ratio metal carbonates such as calcium carbonate and magnesium carbonate with acid esters of phosphoric acid and/or acid esters of phosphorous acid together with organic peroxides and keeping the mixture at room temperature or heating it as the occasion demands, can keep a foamed shape of a composition uniformly cured in the desirably dispersed state. The production of the foamed structure, does not need a specified apparatus and is very easily and inexpensively conducted.

Practical examples are as follows: Parts in the examples are by weight unless otherwise stated and the specific gravity of a foamed structure is apparent specific gravity.

EXAMPLE I

In a reactor provided with an agitator, a thermometer, an inlet of nitrogen gas and a fractionating column were placed 196 parts maleic anhydride, 240 parts hydrogenated bisphenol A and 104 parts neopentyl glycol and the atmosphete was sufficiently replaced by nitrogen gas. While nitrogen gas was flowing at a rate of flow of 50 ml/min, the mixture was allowed to stand at 180° to 210° C. for 8 hr. Then it was cooled to 160° C. and thereafter 0.15 part hydroquinone was added to obtain an unsaturated polyester having an alkali neutralization number of about 37. Styrene was added to the unsaturated polyester thus obtained such that styrene was 30% of the total weight and agitated to obtain a uniform unsaturated polyester resin.

To 50 parts of this unsaturated polyester resin were added 20 parts sodium bicarbonate, 2 parts a benzoyl peroxide paste, 2 parts a condensation product of polyoxyethylenenonylphenol formaldehyde (NIKKOL R-1020 manufactured by Nikko Chemicals Co., Ltd.) and 2 parts dioctyl phosphate, and the mixture was thoroughly mixed.

The paste was introduced into a mold preheated to 125° C. After 3 min. foaming and curing were finished to obtain a shaped article having a specific gravity of about 0.37.

For comparison, a curing test was conducted for the paste prepared by removing the acid ester of phosphoric acid from the ccomposition. A foamed structure could not be obtained.

For further comparison, the same amount of phosphoric acid was used in place of the dioctyl phosphate and foams were vigorously generated by the mixing of sodium bicarbonate and phosphoric acid but rapidly disappeared before the progress of a curing reaction. For this reason, its specific gravity was as high as about 1.16. A desirable cured foamed resin having foams uniform in size and dispersion in great amounts and a favorable foam-stabilizing ability could not be obtained.

EXAMPLE 2

To 50 parts of the unsaturated polyester resin used in example 1 were added 40 parts calcium carbonate, 2 parts a benzoyl peroxide paste, 2 parts a styrene-maleic acid copolymer and 3 parts di-n-butyl phosphate and mixed while agitating. The mixture was introduced into a mold preheated to 125° C. Three minutes after the introduction, it foamed and cured to produce a foamed structure having a specific gravity of about 0.25.

EXAMPLE 3

As in example 1, 389 parts HET acid, 98 parts maleic anhydride, and 168 parts propylene glycol were polymerized to obtain an unsaturated polyester resin having an alkali neutralization number of 28. This was dissolved in styrene to obtain an unsaturated polyester having a styrene concentration of about 30%.

To 50 parts of the unsaturated polyester resin were added 35 parts calcium carbonate and one part a benzoyl peroxide paste. After thorough agitation, 2 parts dioctyl phosphate (including about 30% of a monoester) was added and uniformly mixed to obtain a pasty material.

The paste was introduced into a molded preheated to 120° C. After about 3 min., it foamed and cured into a foamed structure having a specific gravity of about 0.4.

EXAMPLE 4

With the use of the same apparatus as in example 1, 548 parts diol (DIOL 111 manufactured by Asahi Denka Kogyo K.K.) prepared by condensing one mole of decachlorobiphenyl and two moles of monoethanol amine was reacted with 98 parts maleic anhydride to obtain an unsaturated polyester having an acid value of 24. To 65 parts the unsaturated polyester was added 35 parts styrene and it was uniformly dissolved to obtain a reddish-brown unsaturated polyester resin.

To 100 parts the unsaturated polyester resin were added 40 parts aluminum hydroxide, 40 parts calcium carbonate, 2 parts a 55% methyl ethyl ketone peroxide solution and 5 parts antimony trioxide and mixed by thorough agitation, and thereafter 5 parts di-n-butyl phosphate was added and uniformly mixed.

The mixture was introduced into a mold preheated to 130° C. and after about 15 min. it foamed and cured into a uniform foamed shaped structure having a specific gravity of about 0.45. Inflammability of the shaped structure was tested under ASTM 635 and the structure was found nonburn.

EXAMPLE 5

One hundred parts the unsaturated polyester resin used in example 4, 200 parts calcium carbonate and 2 parts a 55% methyl ethyl keton peroxide solution were thoroughly mixed and to it was added 3 parts dioctyl phosphate and agitated.

The paste was introduced into a mold preheated to 130° C. and after about 15 min. it foamed and cured into a foamed structure having a specific gravity of about 0.50.

EXAMPLE 6

To 100 parts the unsaturated polyester resin used in example 3 were added 3 parts calcium carbonate, 2 parts a benzoyl peroxide paste and 10 parts dioctyl phosphate and 3 parts STAFOAM, trade name of Nippon Oils and Fats Co., Ltd. as a foam adjustor was added. After thorough mixing, the mixture was introduced into a mold preheated to 130° C. After 15 min. it foamed and cured into a foamed structure having a specific gravity of about 0.36.

EXAMPLE 7

To 100 parts the unsaturated polyester resin used in example 3 were sufficiently mixed 20 parts calcium carbonate and 1 part cumene hydroperoxide. To the mixture were mixed 0.5 part an accelerator of an organic vanadium type (PROMOTOR E., trade name of Nippon Oils and Fats Co., Ltd.) and 7 parts di-n-butyl phosphate at normal temperature. After about 15 min, it foamed and cured at the same temperature into a foamed structure consisting of independent foams and having a specific gravity of about 0.45.

For comparison, phosphoric acid was used in place of the di-n-butyl phosphate. It foamed but the foams were labile and a desired foamed structure could not be obtained because the foams disappeared before the resin had cured. The specific gravity was 1.22.

EXAMPLE 8

As in example 1, 88.9 parts phthalic anhydride, 137.3 parts maleic anhydride and 167.4 parts propylene glycol were polymerized to obtain an unsaturated polyester resin having an acid value of 27.1. This was dissolved in styrene and made into an unsaturated polyester resin having a styrene concentration of 30%.

To 50 parts the unsaturated polyester resin were added 50 parts calcium carbonate and 1 part a benzoyl peroxide (50%) paste. It was thoroughly mixed on agitation and then 3 parts di-butyl phosphite was added and uniformly mixed.

The pasty substance was introduced into a mold preheated to 120° C. and after 5 min. it foamed and hardened into a foamed structure having a specific gravity of about 0.35.

EXAMPLE 9

To 100 parts the unsaturated polyester resin used in example 8 were added 50 parts calcium carbonate, 2 parts a benzoyl peroxide paste and 20 parts fiber glass (chopped strands 6 mm in length) and mixed on thorough agitation. Thereafter 5 parts dioctyl phosphate was added and uniform mixing was conducted.

The paste was introduced into a mold preheated to 120° C. and after about 3 min., it foamed and hardened into a fiber glass-reinforced foamed structure having a specific gravity of about 0.55.

EXAMPLE 10

To 36 parts diallyl phthalate was dissolved in 24 parts a diallyl phthalate prepolymer having a number average molecular weight of 15,600 and an Iodine value of 53. To this solution were added 3 parts dioctyl phosphate and 3 parts dicumyl peroxide and thereafter 40 parts calcium carbonate was added. Thorough mixing was conducted.

The pasty substance was introduced into a plate mold and it was hardened by raising the temperature from 120° to 160° C. in 2 hr. into a foamed structure (dilated 2.7 times the volume) having a specific gravity of 0.50.

For comparison, phosphoric acid of the same weight was used in place of the dioctyl phosphate.

Vigorous foaming occurred in the mold and foams disappeared rapidly with the result that a foamed structure was unobtainable. The specific gravity of the foamed structure was 1.31.

EXAMPLE 11

To 40 parts diallyl terephthalate was dissolved 20 parts a diallyl terephthalate prepolymer having a number average molecular weight of 8,200 and an Iodine value of 80 and then to this solution were added 1 part dibutyl phosphate and 3 parts dicumyl peroxide. Further, 40 parts calcium carbonate was mixed into the mixture. The mixture was introduced into a plate mold and temperature was raised from 150° to 160° C. in one hr. for curing to obtain a foamed shaped structure having a specific gravity of 0.82.

EXAMPLE 12

In 40 parts diallyl phthalate was dissolved 10 parts a diallyl terephthalate prepolymer having a number average molecular weight of 7,800 and an Iodine value of 82 and to this solution were added 1 part dioctyl phosphate, 2 parts dicumyl peroxide and 2 parts STAFOAM, trade name of Nippon Yushi Co., Ltd. Then, 40 parts calcium carbonate and 10 parts glass beads were thoroughly mixed in the mixture. The obtained pasty mixture was cured on heating by the procedure in example 10 into a foamed structure having a specific gravity of 0.85.

EXAMPLE 13

In 20 parts diallyl isophthalate was dissolved 20 parts a diallyl phthalate propolymer and to this solution were added 1 part diisodecyl phosphate and 3 parts dicumyl peroxide. Further, 40 parts calcium carbonate and 20 parts alumina were added and thorough mixing was conducted. The mixture was heated and hardened by the procedure in example 10 into a foamed structure having a specific gravity of 0.63.

EXAMPLE 14

In 36 parts diallyl phthalate was dissolved 24 parts a diallyl phthalate prepolymer having a number average molecular weight of 15,600 and an Iodine value of 53. To this solution were added 3 parts a di-n-butyl phosphate and 2 parts benzoyl peroxide. With the addition of 40 parts calcium carbonate, thorough mixing was conducted.

The obtained pasty material was introduced into a plate mold and temperature was raised from 25° to 80° C. in 5 hr. for curing. A foamed structure having a specific gravity of 0.62 (dilated 2.9 times the volume) was obtained.

For comparison, with the use of phosphoric acid in place of the di-n-butyl phosphate the paste was foamed and cured into a poor foamed structure having a specific gravity of as high as 1.24.

EXAMPLE 15

Seventy parts 1,2-polybutadiene (NISSO PB B-4000, trade name of Nippon Soda Co., Ltd.) having a number average molecular weight of 4,030 and containing 91.6% of 1,2-vinyl groups, 2 parts dioctyl phosphate, and 2 parts dicumyl peroxide and 1 part benzoyl peroxide as a polymerization initiator were mixed. Then, with the addition of 30 parts calcium carbonate, the mixture was vigorously agitated for uniform mixing. The mixture was introduced into a mold preheated to 150° C. and heated for 1 hr. After 1 hr. a foamed structure having a specific gravity of 0.50 was obtained.

For comparison, for the mixture (paste) free from the dioctyl phosphate foaming and curing test was conducted in like manner, but a foamed structure was unobtainable.

For further comparison, phosphoric acid of the same weight was used instead of the dioctyl phosphate. After vogorous foaming the foams rapidly disappeared and a foamed structure could not be obtained. The specific gravity of the resultant structure was 1.28.

EXAMPLE 16

A mixture of both 40 parts urethane-modified 1,2-polybutadiene (NISSO PB GTE-2110, trade name of Nippon Soda Co., Ltd.) and 40 parts 1,2-polybutadiene, 2 parts a diisodecyl phosphate and 2 parts dicumyl peroxide and 1 part benzoyl peroxide as a polymerization inititator were mixed. Then 20 parts calcium carbonate was added. The paste thus obtained after the thorough mixing was heated by the procedure of example 15 to obtain a foamed structure having a specific gravity of 0.56.

For comparison, foaming and curing of the paste with the diisodecyl phosphate removed was tested in like manner, but a foamed structure was unobtainable.

EXAMPLE 17

To a mixture of both 35 parts urethane-modified 1,2-polybutadiene (NISSO PB GTE-2110, trade name of Nippon Soda Co., Ltd.) and 25 parts diallyl phthalate were added 1 part dioctyl phosphate of and 2.5 parts dicumyl peroxide and 1.5 parts benzoyl peroxide. Further, 40 parts calcium carbonate was added. After the thorough mixing, the mixture was introduced in a mold and held at 150° to 160° C. for 1 hr. A foamed shaped structure having a specific gravity 0.74 was obtained.

EXAMPLE 18

70 parts 1,2-polybutadiene (NISSO PB G-3000, trade name of Nippon Soda Co., Ltd.) having a number average molecular weight of 3,030 and containing 91.9% of 1,2-vinyl groups, 1 part dioctyl phosphate and 2 parts dicumyl peroxide and 1 part benzoyl peroxide as a polymerization initiator were mixed, and thereafter 20 parts calcium carbonate and 10 parts pulverized glass were added and mixed. The mixture was heated by the same procedure as in example 17. A foamed structure having a specific gravity of 0.67 was obtained.

EXAMPLE 19

Twenty parts urethane-modified 1,2-polybutadiene (NISSO PB GTE 2110, trade name of Nippon Soda Co., Ltd.) 40 parts diallyl phthalate, 1 part dibutyl phosphate, 2 parts "Stafoam" (trade name of Nippon Oils and Fats Co., Ltd.) as a foam regulator and 2 parts dicumyl peroxide and 1 part benzoyl peroxide as a polymerization initiator were mixed and thereafter thoroughly mixed after the addition of 30 parts calcium carbonate and 10 parts alumina. The obtained paste was hardened with a temperature rise of from 120° to 160° C. in 2 hr. to obtain a foamed structure having a specific gravity of 0.37.

EXAMPLE 20

Seventy parts 1,2-polybutadiene (NISSO PB B-4000, trade name of Nippon Soda Co., Ltd.) having a number average molecular weight of 4,030 and containing 91.6% of 1,2-vinyl groups, 3 parts dibutyl phosphate and 4 parts benzoyl peroxide as a polymerization initiator were mixed and thereafter were vigorously agitated and uniformly mixed after the addition of 30 parts calcium carbonate. The mixture was introduced in a mold heated to 80° C. and heating was continued for about 6 hr. to obtain a foamed structure having a specific gravity of 0.67.

For comparison, phosphoric acid was used in the example in place of the dibutyl phosphate and foaming and curing of the paste was tested. The specific gravity of the obtained structure was 1.21 resulting in a poorly foamed product.

We claim:

1. A process for the production of a cured foamed structure characterized by:
   I. mixing to a uniformly dispersed state
      A. at least one member of the group consisting of metal carbonates and metal bicarbonates,
      B. at least one member of the group consisting of phosphoric acid esters and phosphorous acid esters, and
      C. a curable resin composition selected from at least one member of the group consisting of an unsaturated polyester resin composition, a diallyl phthalate resin composition, and a 1,2-butadiene-containing polymer composition; and then
   II. heating the mixture at a temperature of from 80° to 160° C. to form a foam, cured three-dimensionally by double bonds, with the proviso that where R and R' are butyl, the temperature may be as low as 20° C.

2. The process of claim 1 wherein component (A) is selected from at least one of the group consisting of alkali metals, alkaline earth metals, iron, cobalt, and nickel.

3. The process of claim 1 wherein the phosphoric acid ester of component (B) is selected from the group having the formulae

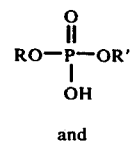

and

-continued

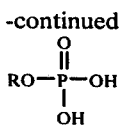

wherein R and R' are each selected from the group consisting of
- $-C_nH_{(2n+1)}$, $n$ being 2 to 20,
- $-C_mH_{(2m+1)}(OCH_2CH_2)_l$, $m$ being 2 to 20 and $l$ being 2 to 10, or
- $-C_6H_5$ 4. The process of claim 1 wherein the phosphorous acid ester of component (B) is selected from the group having the formulae

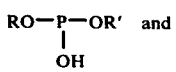

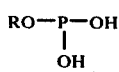

wherein R and R' may be different or the same and are each selected from the group consisting of
- $-C_nH_{(2n+1)}$, $n$ being 2 to 20,
- $-C_mH_{(2m+1)}(OCH_2CH_2)_l$, $m$ being 2 to 20 and $l$ being 2 to 10, or
- $-C_6H_5$ 5. The process of claim 1 wherein the unsaturated polyester resin composition in component (C) consists essentially of an unsaturated acid component, a saturated acid component, a polyhydric alcohol component, and a vinyl monomer component.

6. The process of claim 5 wherein the unsaturated acid is selected from the group consisting of: maleic acid; fumaric acid; itaconic acid; citraconic acid; and anhydrides thereof.

7. The process of claim 5 wherein the saturated acid is selected from the group consisting of: adipic acid; sebacic acid; succinic acid; phthalic acid; isophthalic acid; terephthalic acid; and anhydrides thereof; halogenated derivatives of carboxylic acids; and anhydrides of the halogenated derivatives of the carboxylic acids.

8. The process of claim 5 wherein the polyhydric alcohol component is selected from the group consisting of: ethylene glycol; propylene glycol; diethylene glycol; dipropylene glycol; trimethylene glycol; butanediol-1,3; butandiol-1,4; hexanediol 1,3; neopentyl glycol; hydrogenated bisphenol A; a propylene oxide adduct of bisphenol A; an ethylene oxide adduct of bisphenol A; glycerin; and pentaerythritol.

9. The process of claim 5 wherein the vinyl monomer is selected from the group consisting of styrene, vinyl toluene, α-methyl styrene, chlorostyrene, t-butyl styrene, methyl methacrylate ethyl methyl methacrylate, vinyl acetate, diallyl phthalate, and triallyl cyanurate.

10. The process of claim 1 wherein the diallyl phthalate resin composition in component (C) consists essentially of at least one member selected from the group consisting of a diallyl phthalate monomer, a linear polymer obtained by polymerizing the monomer, and an unsaturated compound copolymerizable therewith.

11. The process of claim 10 wherein the diallyl phthalate monomer is selected from at least one of the group consisting of diallyl orthophthalate, diallyl isophthalate, diallyl terephthalate, diallyl (methyl isophthalate), diallyl (methyl terephthalate) and diallyl naphthalate.

12. The process of claim 10 wherein the unsaturated copolymerizable compound is selected from at least one of the group consisting of diallyl maleate, triallyl cyanurate, triallyl isocyanurate, triallyl phosphate, styrene, vinyl toluene, methylmethacrylate, ethyl methylmethacrylate, diethyl fumarate, and polybutadiene.

13. The process of claim 1 wherein the 1,2-butadienecontaining polymer composition in component (C) contains at least 30% of 1,2-butadiene of the total recurring units, has a number average molecular weight of more than 500, and contains a vinyl compound copolymerizable with the 1,2-butadiene.

14. The process of claim 13 wherein the 1,2-butadiene is more than 50% of the total recurring units.

15. The process of claim 13 wherein the 1,2-butadiene is more than 80% of the total recurring units.

16. The process of claim 15 wherein the number average molecular weight is 1,000 to 10,000.

17. The process of claim 13 wherein the vinyl compound is selected from at least one of the group consisting of styrene, α-methyl styrene, vinyl toluene, acrylonitrile, isoprene, methyl methacrylate, diethyl maleate, diallyl phthalate, and diallyl maleate.

18. The process of claim 1 wherein 0.5 to 20 parts by weight of component (A) and 1 to 250 parts by weight of component (B) are used per 100 parts by weight of component (C).

19. The process of claim 18 wherein 1 to 10 parts by weight of component (A) and 3 to 200 parts by weight of component (B) are used per 100 parts by weight of component (C).

20. The process of claim 1 wherein component (B) is selected from at least one of the group consisting of dimethyl phosphate, dibutyl phosphate, dioctyl phosphate, diisodecyl phosphate, diphenyl phosphate, monobutyl phosphate, dimethyl phosphite, diethyl phosphite, dibutyl phosphite, diphenyl phosphite, and diisopropyl phosphite.

21. The process of claim 1 wherein component (A) is selected from sodium bicarbonate and calcium carbonate, component (B) is selected from dioctyl phosphate, di-n-butyl phosphate, and di-butyl phosphite, component (C) is an unsaturated polyester resin composition, and wherein the mixture is heated to a temperature of from 120° to 160° C.

22. The process of claim 1 wherein component (A) consists essentially of calcium carbonate, component (B) is selected from the group consisting of dibutyl phosphate, dioctyl phosphate, and diisodecyl phosphate, and component (C) is a diallyl phthalate resin composition and wherein the mixture is heated to a temperature of from 80° to 160° C.

23. The process of claim 1 wherein component (A) consists essentially of calcium carbonate, component (B) is selected from the group consisting of dibutyl phosphate, dioctyl phosphate and diisodecyl phosphate, and component (C) is a 1,2-butadienecontaining polymer composition, and wherein the mixture is heated to a temperature of from 80° to 160° C.

* * * * *

UNITED STATES PATENT OFFICE
CERTIFICATE OF CORRECTION

Patent No. 4,016,112  Dated April 5, 1977

Inventor(s) Atsusuke Kajiura et al.

It is certified that error appears in the above-identified patent and that said Letters Patent are hereby corrected as shown below:

Insert the following Foreign Priority Data:

-- Jan. 28, 1972     Japan............47-10310

Apr. 18, 1972     Japan............47-39029

June 6, 1972      Japan............47-55661   --.

Signed and Sealed this

Fourteenth Day of June 1977

[SEAL]

Attest:

RUTH C. MASON
*Attesting Officer*

C. MARSHALL DANN
*Commissioner of Patents and Trademarks*